(12) United States Patent
Wang et al.

(10) Patent No.: US 12,041,688 B2
(45) Date of Patent: Jul. 16, 2024

(54) SCREEN PROJECTION METHOD AND SYSTEM

(71) Applicant: SHANGHAI HODE INFORMATION TECHNOLOGY CO., LTD., Shanghai (CN)

(72) Inventors: Menghui Wang, Shanghai (CN); Hao Wang, Shanghai (CN); Yaoqi Zhang, Shanghai (CN); Zhihui Yang, Shanghai (CN); Chunyu Long, Shanghai (CN); Lei Huang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/923,213

(22) PCT Filed: Dec. 29, 2020

(86) PCT No.: PCT/CN2020/141033
§ 371 (c)(1),
(2) Date: Nov. 3, 2022

(87) PCT Pub. No.: WO2021/223454
PCT Pub. Date: Nov. 11, 2021

(65) Prior Publication Data
US 2023/0161541 A1    May 25, 2023

(30) Foreign Application Priority Data
May 6, 2020  (CN) .......................... 202010374023.4

(51) Int. Cl.
*H04W 8/00*  (2009.01)
*H04L 67/51*  (2022.01)
*G06F 3/14*  (2006.01)

(52) U.S. Cl.
CPC ............. *H04W 8/005* (2013.01); *H04L 67/51* (2022.05); *G06F 3/1454* (2013.01)

(58) Field of Classification Search
CPC ....... H04W 8/005; H04L 67/51; G06F 3/1454
See application file for complete search history.

(56) References Cited

U.S. PATENT DOCUMENTS 9,876,862 B1 *  1/2018  Lambert ................. H04L 69/24
9,930,151 B2 *  3/2018  Sheu ....................... H04L 67/51
(Continued)

FOREIGN PATENT DOCUMENTS

CN    108540552 A    9/2018
CN    108901024 A    11/2018
(Continued)

OTHER PUBLICATIONS

International Patent Application No. PCT/CN2020/141033; Int'l Search Report; dated Mar. 16, 2021; 2 pages.

*Primary Examiner* — David R Lazaro
(74) *Attorney, Agent, or Firm* — BakerHostetler

(57) ABSTRACT

This application provides techniques for projecting content from a device to other device. The techniques comprise performing a first device discovery operation by using a first network, wherein the first network comprises a local area network, and wherein the performing a first device discovery operation by using a first network further comprises sending broadcast information in the local area network; performing a second device discovery operation by using a second network, wherein the second network comprises a wide area network, and wherein the performing a second device discovery operation by using a second network further comprises communicating with a server via the wide area network; determining the other device to which the content is to be projected based on the first device discovery (Continued)

operation and the second device discovery operation; and establishing a network connection with the other device for content projection.

17 Claims, 8 Drawing Sheets

(56) References Cited

U.S. PATENT DOCUMENTS

| | | | | |
|---|---|---|---|---|
| 10,999,331 | B1* | 5/2021 | Marchand | H04L 65/403 |
| 2008/0274719 | A1* | 11/2008 | Russell | H04W 4/12 |
| | | | | 455/445 |
| 2015/0341570 | A1* | 11/2015 | Jaynes | H04L 67/535 |
| | | | | 709/227 |
| 2015/0373065 | A1* | 12/2015 | Holmquist | H04L 65/1069 |
| | | | | 715/753 |
| 2016/0173659 | A1* | 6/2016 | Sheu | H04L 67/51 |
| | | | | 709/230 |
| 2016/0242108 | A1* | 8/2016 | Kim | H04W 76/12 |
| 2016/0270145 | A1* | 9/2016 | Srinivasa Gopalan | |
| | | | | H04L 67/146 |
| 2017/0318098 | A1* | 11/2017 | Sanghvi | H04W 84/18 |
| 2018/0152827 | A1* | 5/2018 | Perez | H04L 67/52 |
| 2018/0286129 | A1* | 10/2018 | Harviainen | G02B 27/017 |
| 2019/0320219 | A1* | 10/2019 | Yoden | H04W 8/005 |
| 2021/0182013 | A1* | 6/2021 | Guo | H04N 21/25808 |
| 2021/0183336 | A1* | 6/2021 | Hassan | G06F 3/04886 |
| 2022/0239718 | A1* | 7/2022 | Song | H04L 67/104 |
| 2023/0083485 | A1* | 3/2023 | Yang | H04W 8/005 |
| | | | | 455/41.3 |
| 2023/0161541 | A1* | 5/2023 | Wang | H04W 8/005 |
| | | | | 345/173 |
| 2023/0262026 | A1* | 8/2023 | Wu | H04W 8/26 |
| | | | | 709/245 |

FOREIGN PATENT DOCUMENTS

| | | |
|---|---|---|
| CN | 109120970 A | 1/2019 |
| CN | 109922205 A | 6/2019 |
| CN | 110515573 A | 11/2019 |
| CN | 110602087 A | 12/2019 |
| CN | 111629371 A | 9/2020 |

* cited by examiner

SCREEN PROJECTION METHOD AND SYSTEM

CROSS-REFERENCE TO RELATED APPLICATIONS

This application is the U.S. National Stage of International Application No. PCT/CN2020/141033, filed on Dec. 29, 2020, which claims priority to Chinese Patent Application No. 202010374023.4, filed on May 6, 2020, and entitled "SCREEN PROJECTION METHOD AND SYSTEM", both of which are incorporated herein by reference in their entireties.

TECHNICAL FIELD

Embodiments of this application relate to the field of computer technologies, and in particular, to a screen projection method and system, a computer device, and a computer-readable storage medium.

BACKGROUND

With the rise of the Internet of Things and intelligent devices, the intelligent devices may be communicatively connected to each other by using the Internet of Things, and one of the intelligent devices that are communicatively connected may perform a control operation, a screen projection operation, or another operation on another intelligent device. The screen projection operation means projecting display content of an intelligent device A onto an intelligent device B, so that the intelligent device B can also synchronously display the display content of the intelligent device A.

SUMMARY

An objective of embodiments of this application is to provide a screen projection method and system, a computer device, and a computer-readable storage medium, to resolve a problem of a low discovery success rate and low accuracy of device discovery in a conventional screen projection operation, and a problem of poor screen projection experience.

An aspect of the embodiments of this application provides a screen projection method, where the method includes: performing a first device discovery operation by using a first network; performing a second device discovery operation by using a second network; determining, based on the first device discovery operation and the second device discovery operation, a screen projection object used for a screen projection operation; and establishing a network connection to the screen projection object.

Optionally, the method further includes: performing a corresponding device discovery operation based on a device discovery policy, where the device discovery policy includes a first device discovery policy, a second device discovery policy, and a third device discovery policy; the first device discovery policy is correspondingly used to perform the first device discovery operation; the second device discovery policy is correspondingly used to perform the second device discovery operation; and the third device discovery policy is correspondingly used to perform both the first device discovery operation and the second device discovery operation.

Optionally, the performing a corresponding device discovery operation based on a device discovery policy includes: monitoring whether a device discovery page is entered; and if the device discovery page is entered, performing the corresponding device discovery operation based on the device discovery policy.

Optionally, the first network includes a local area network; and the performing a first device discovery operation by using a first network includes: sending first broadcast information in the local area network; receiving response information returned by a first terminal device in the local area network based on the first broadcast information; and determining the first terminal device as a candidate screen projection object based on the response information.

Optionally, the first network includes a local area network; and the performing a first device discovery operation by using a first network includes: receiving second broadcast information in the local area network, where the second broadcast information includes broadcast information from a first terminal device; and determining the first terminal device as a candidate screen projection object based on the second broadcast information.

Optionally, the second network includes a wide area network; and the performing a second device discovery operation by using a second network includes: accessing a server by using the wide area network, so that the server returns device information of a second terminal device associated with a same account; and determining the second terminal device as a candidate screen projection object based on the device information of the second terminal device.

Optionally, the determining, based on the first device discovery operation and the second device discovery operation, a screen projection object used for a screen projection operation includes: determining the first terminal device or the second terminal device as the screen projection object.

Optionally, the establishing a network connection to the screen projection object includes: if the second terminal device is determined as the screen projection object, determining, based on the device information of the second terminal device, whether the second terminal device is located in the local area network; and if the second terminal device is located in the local area network, establishing a first network connection to the second terminal device based on the local area network, and establishing a second network connection to the second terminal device based on the wide area network; or if the second terminal device is not located in the local area network, establishing the second network connection to the second terminal device based on the wide area network.

Optionally, the method further includes: determining whether both the first network connection and the second network connection are successfully established; and if both the first network connection and the second network connection are successfully established, sending communication content to the second terminal device by using the first network connection, and sending the communication content to the second terminal device by using the second network connection, where the communication content includes an identifier used for a deduplication operation.

An aspect of the embodiments of this application further provides a screen projection system, where the screen projection system includes: a first discovery module, configured to perform a first device discovery operation by using a first network; a second discovery module, configured to perform a second device discovery operation by using a second network; a determining module, configured to determine, based on the first device discovery operation and the second device discovery operation, a screen projection object used for a screen projection operation; and an establishment module, configured to establish a network connection to the screen projection object.

An aspect of the embodiments of this application further provides a computer device, including a memory, a processor, and computer readable instructions that are stored in the memory and that can be run on the processor, and when executing the computer readable instructions, the processor implements the following steps: performing a first device discovery operation by using a first network; performing a second device discovery operation by using a second network; determining, based on the first device discovery operation and the second device discovery operation, a screen projection object used for a screen projection operation; and establishing a network connection to the screen projection object.

An aspect of the embodiments of this application further provides a computer-readable storage medium, including a memory, a processor, and computer readable instructions that are stored in the memory and that can be run on the processor, and when executing the computer readable instructions, the processor implements the following steps: performing a first device discovery operation by using a first network; performing a second device discovery operation by using a second network; determining, based on the first device discovery operation and the second device discovery operation, a screen projection object used for a screen projection operation; and establishing a network connection to the screen projection object.

According to the screen projection method and system, the computer device, and the computer-readable storage medium that are provided in the embodiments of this application, a plurality of corresponding device discovery operations are performed by using a plurality of networks, so that a candidate screen projection object is discovered in a plurality of manners. This avoids a problem that a discovery success rate and accuracy are low by using a single device discovery operation, effectively increases a discovery success rate and accuracy of device discovery, and therefore improves screen projection experience.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the descriptions "first" and "second" in the embodiments of this application are merely used for description, and shall not be understood as an indication or implication of relative importance or an implicit indication of a quantity of indicated technical features. Therefore, features limited by "first" or "second" may explicitly or implicitly include at least one of the features. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

A screen projection operation generally includes a plurality of steps. An example in which a smartphone projects display content onto a smart television is used. In this case, the smartphone needs to perform the following steps: (1) discovering a smart television in a same local area network based on a device discovery protocol; (2) establishing a connection to the smart television; (3) projecting the display content onto the smart television based on the connection.

However, a discovery success rate and accuracy of device discovery are low in step (1). This affects screen projection experience.

Figure 1:
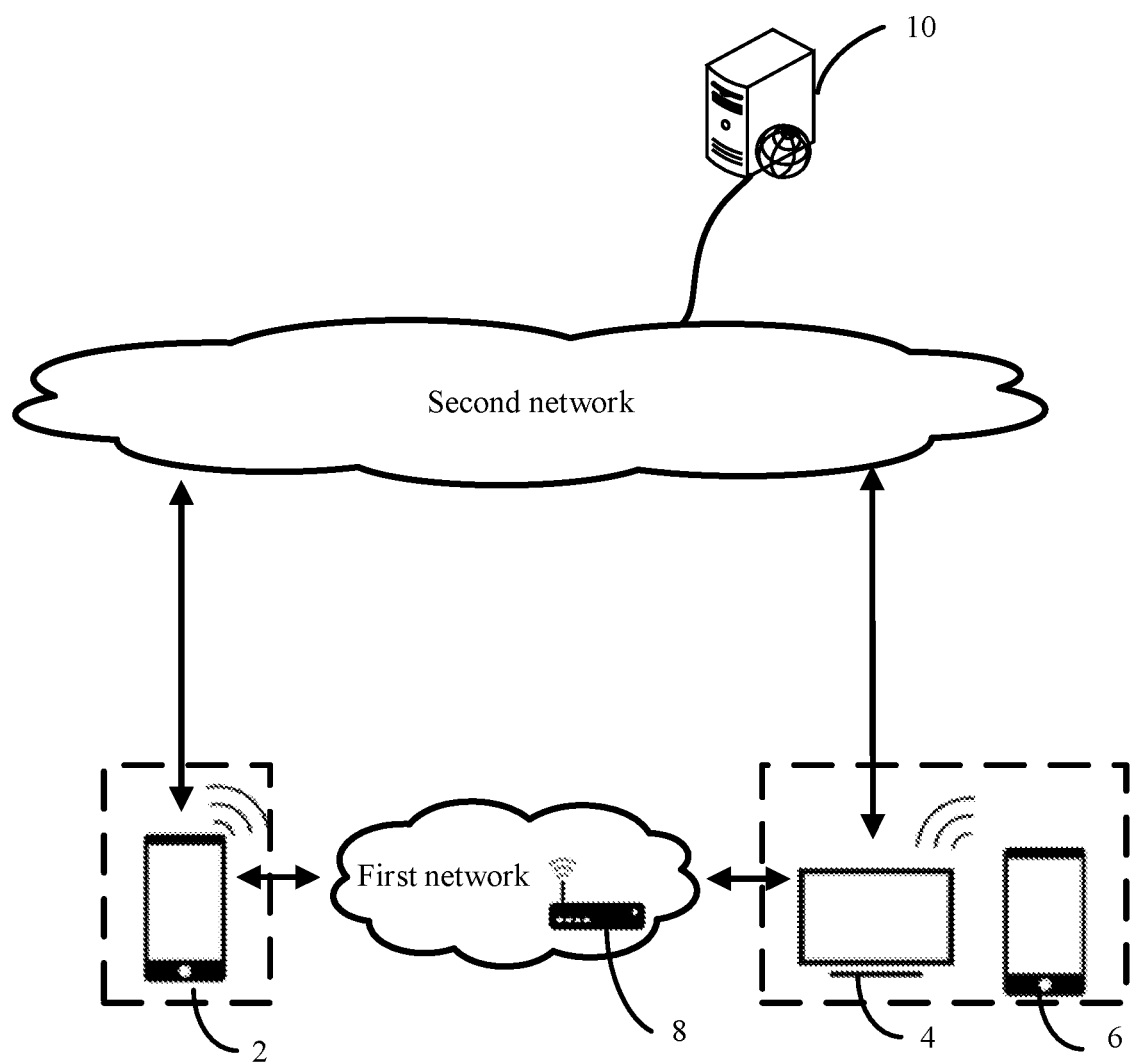
FIG. 1 is a schematic diagram of a network architecture of a screen projection system of a screen projection method according to an embodiment of this application.

FIG. 1 is a schematic diagram of a network architecture of a screen projection system of a screen projection method according to an embodiment of this application. The diagram of the network architecture of the screen projection system includes a computer device 2, a first terminal device 4, a second terminal device 6, a router 8, and a server 10.

The computer device 2 is used as a transmit end in the network architecture of the screen projection system, and is configured to: project display content onto another device, and send various instructions to the another device. The computer device 2 may be, for example, a smartphone, a tablet computer, a game console, or a laptop computer.

The first terminal device 4 and the second terminal device 6 are used as display ends in the network architecture of the screen projection system, and are configured to: receive the display content and the various instructions of the computer device 2, and synchronously display the received display content on a display panel of the terminal device or a display panel of an associated device. The first terminal device 4 and the second terminal device 6 each may be a related device with a large screen such as a virtual reality device, a set top box, a smart television, a vehicle terminal device, or a large outdoor display panel, or certainly, may be a related device with a small screen such as a smartphone, a tablet computer, or a laptop computer.

The router 8 is used as a gateway in the network architecture of the screen projection system, and is configured to: establish a local area network and provide an Internet service. The router 8 can provide a local connection between the computer device 2 and each of the first terminal device 4 and the second terminal device 6.

The server 10 is used as a cloud device in the network architecture of the screen projection system, and is configured to provide a cloud service such as a cloud account management service. The server 10 may be a rack server, a blade server, a tower server, a cabinet server (including an independent server, or a server cluster including a plurality of servers), or the like.

Embodiment 1

Figure 2:
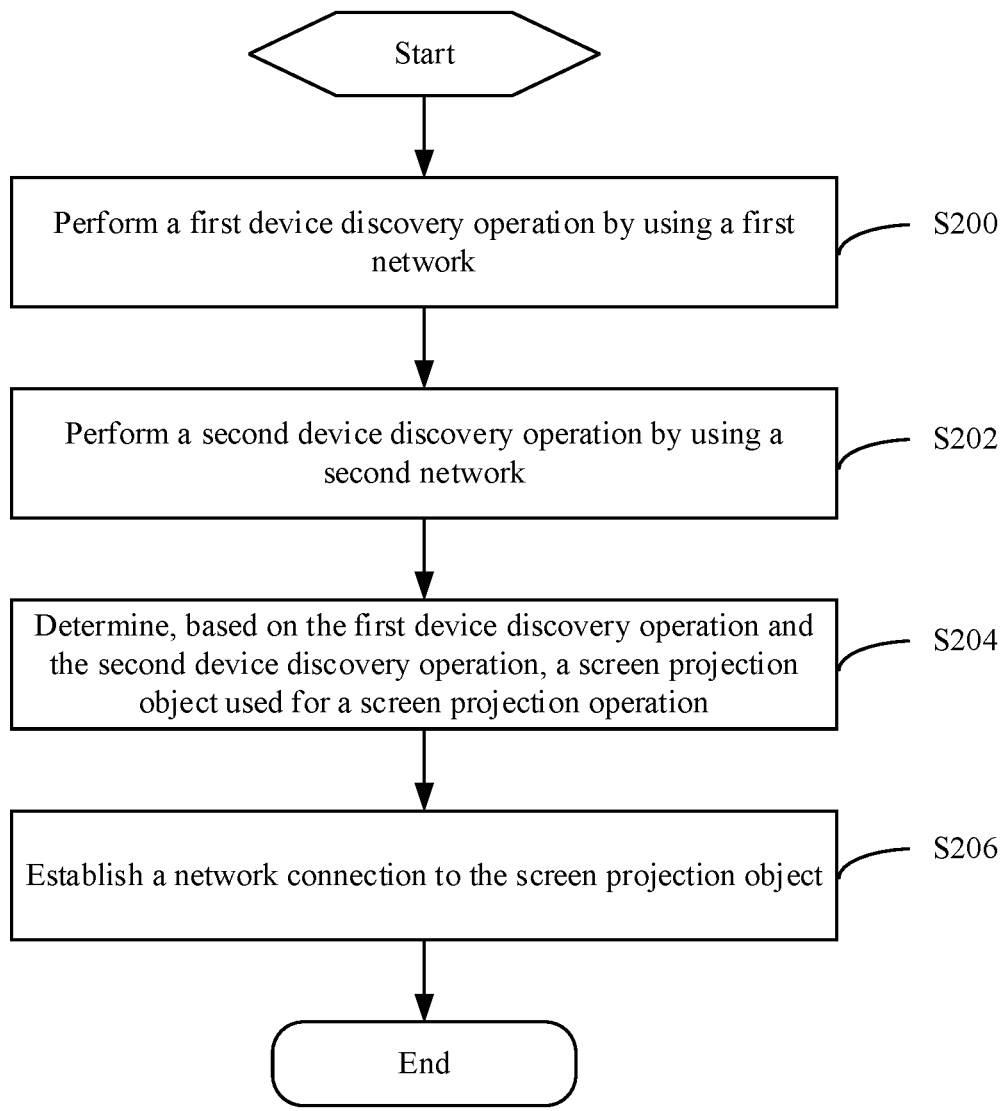
FIG. 2 is a schematic flowchart of a screen projection method according to Embodiment 1 of this application.

FIG. 2 is a schematic flowchart of a screen projection method according to Embodiment 1 of this application. It may be understood that the flowchart in this method embodiment is not used to limit a sequence of performing steps. The following is described by using an example in which a computer device 2 is an execution body.

As shown in FIG. 2, the screen projection method includes steps S200 to S206.

Step S200. Perform a first device discovery operation by using a first network.

The first network may be a local area network, and the local area network may be a wired local area network or a wireless local area network. In an example embodiment, as shown in FIG. 1, the wireless local area network may be a Wi-Fi network established by the router 8. In some other embodiments, the wireless local area network may be a Bluetooth network based on a Bluetooth protocol, a ZigBee network based on a ZigBee protocol, or the like.

The first device discovery operation includes an active discovery mode, a passive discovery mode, and a hybrid mode of active discovery and passive discovery. The hybrid mode may further increase a discovery success rate and accuracy of device discovery, and reduce a discovery failure.

Figure 3:
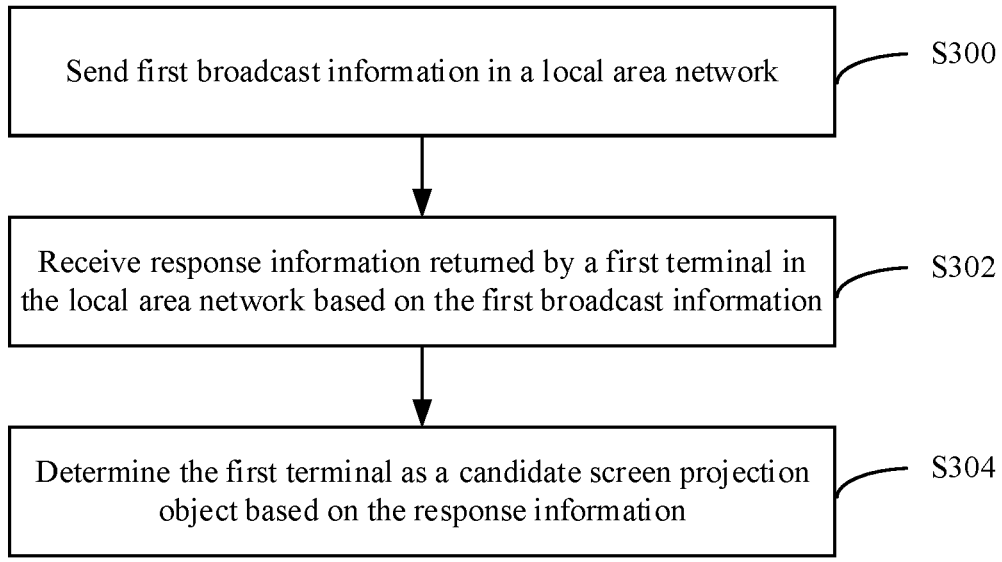
FIG. 3 schematically shows a sub-step of step S200 in FIG. 2.

Active Discovery Mode:

In an example embodiment, as shown in FIG. 3, step S200 may include steps S300 to S304. Step S300. The computer device 2 sends first broadcast information in the local area network. Step S302. The computer device 2 receives response information returned by a first terminal device 4 in the local area network based on the first broadcast information. S304. The computer device 2 determines the first terminal device 4 as a candidate screen projection object based on the response information. For example, the computer device 2 may perform a User Datagram Protocol (UDP) broadcast operation to send the first broadcast information in the local area network. After receiving the first broadcast information, the first terminal device 4 parses the first broadcast information to obtain an address (for example, an IP address or a MAC address) of the computer device 2, and sends the response information to the computer device 2 based on the address of the computer device 2. The computer device 2 may discover the first terminal device 4 in the local area network based on the response information. The foregoing device discovery operation is one manner of ensuring a discovery success rate and accuracy of device discovery, and may be used to discover a terminal device device in a passive discovery state.

Figure 4:
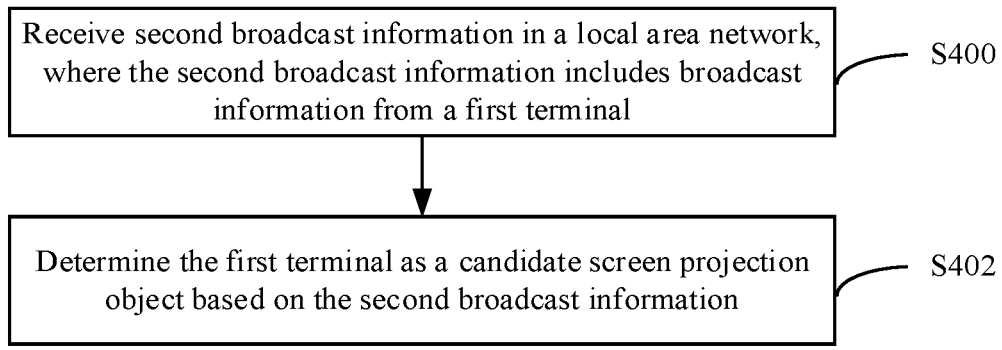
FIG. 4 schematically shows another sub-step of step S200 in FIG. 2.

Passive Discovery Mode:

In an example embodiment, as shown in FIG. 4, step S200 may include steps S400 and S402. Step S400. The computer device 2 receives second broadcast information in the local area network, where the second broadcast information includes broadcast information from a first terminal device. Step S402. The computer device 2 determines the first terminal device as a candidate screen projection object based on the second broadcast information. For example, the computer device 2 listens to broadcast information in the local area network, for example, the second broadcast information from the first terminal device 4. After receiving the second broadcast information, the computer device 2 parses the second broadcast information to obtain an address (for example, an IP address or a MAC address) of the first terminal device 4. In other words, the computer device 2 may discover the first terminal device 4 in the local area network based on the second broadcast information. The foregoing device discovery operation is one manner of ensuring a discovery success rate and accuracy of device discovery, and may be used to discover a terminal device device in an active discovery state.

Certainly, the computer device 2 may perform both the device discovery operation corresponding to the active discovery mode and the device discovery operation corresponding to the passive discovery mode, to further increase the discovery success rate and accuracy of device discovery.

Step S202. Perform a second device discovery operation by using a second network.

The second network may be a wide area network such as the Internet. The wide area network may include a physical link such as a coaxial cable link, a twisted-pair cable link, an optical fiber link, or a combination thereof. The wide area network may further include a wireless link such as a cellular link or a satellite link.

Figure 5:
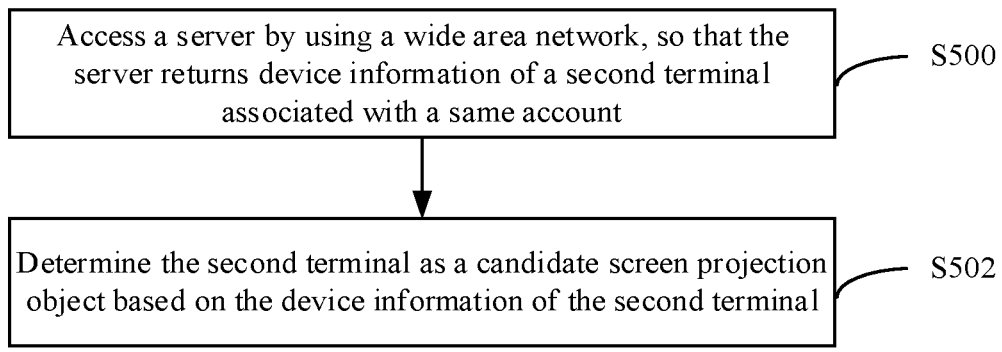
FIG. 5 schematically shows a sub-step of step S202 in FIG. 2.

In an example embodiment, as shown in FIG. 5, step S202 may include steps S500 and S502. Step S500. Access a server 10 by using the wide area network, so that the server returns device information of a second terminal device associated with a same account. Step S502. Determine the second terminal device as a candidate screen projection object based on the device information of the second terminal device. For example, the computer device 2 and the second terminal device 6 are associated with a same account of the server 10. The computer device 2 sends a device discovery request to the server 10. After receiving the device discovery request, the server 10 determines whether another terminal device device such as the second terminal device 6 is recorded in a target account associated with the computer device 2. If the second terminal device 6 is recorded in the target account associated with the computer device 2, the server 10 may return the device information of the second terminal device 6 to the computer device 2. In other words, the computer device 2 may discover the second terminal device 6 based on the device information returned by the server 10. It should be noted that, as shown in FIG. 1, the second terminal device 6 may be a terminal device device located in the local area network shown in FIG. 1. Certainly, the second terminal device 6 may be a terminal device device at a remote end. The foregoing device discovery operation is one manner of ensuring a discovery success rate and accuracy of device discovery, and may be used to discover a terminal device device in the local area network and at the remote end.

It should be noted that, as shown in FIG. 1, the first terminal device 4 and the second terminal device 6 are not one terminal device. In some other embodiments, the first terminal device 4 and the second terminal device 6 may be one terminal device, that is, the computer device 2 separately discovers the terminal device by using the first network and the second network.

In an example embodiment, the computer device 2 and the second terminal device 6 may be connected by using a same conference room number or room number or two-dimensional code scanning. The server 10 determines, based on the same conference room number or room number or two-dimensional code scanning, that the second terminal device 6 may be used as a candidate screen projection object of the computer device 2.

Step S204. Determine, based on the first device discovery operation and the second device discovery operation, a screen projection object used for a screen projection operation.

The following discovery results may be obtained by using the first device discovery operation: (1) No terminal device device is discovered. (2) The first terminal device 4 is discovered. (3) The second terminal device 6 is discovered. (4) The first terminal device 4 and the second terminal device 6 are discovered.

The following discovery results may be obtained by using the second device discovery operation: (1) No terminal device device is discovered. (2) The first terminal device 4 is discovered. (3) The second terminal device 6 is discovered. (4) The first terminal device 4 and the second terminal device 6 are discovered.

It may be learned that the terminal device device discovered by using the first device discovery operation and the terminal device device discovered by using the second device discovery operation may be repeatedly discovered. In an example embodiment, if a terminal device device is earliest discovered by using a device discovery operation, the computer device 2 may use an earliest discovery result as a unique discovery result of the terminal device device. For example, if the computer device 2 discovers the second terminal device 6 by using the second device discovery operation earlier than by using the first device discovery operation, a discovery result of the second device discovery operation is used as a unique discovery result of the second terminal device 6.

Figure 6:
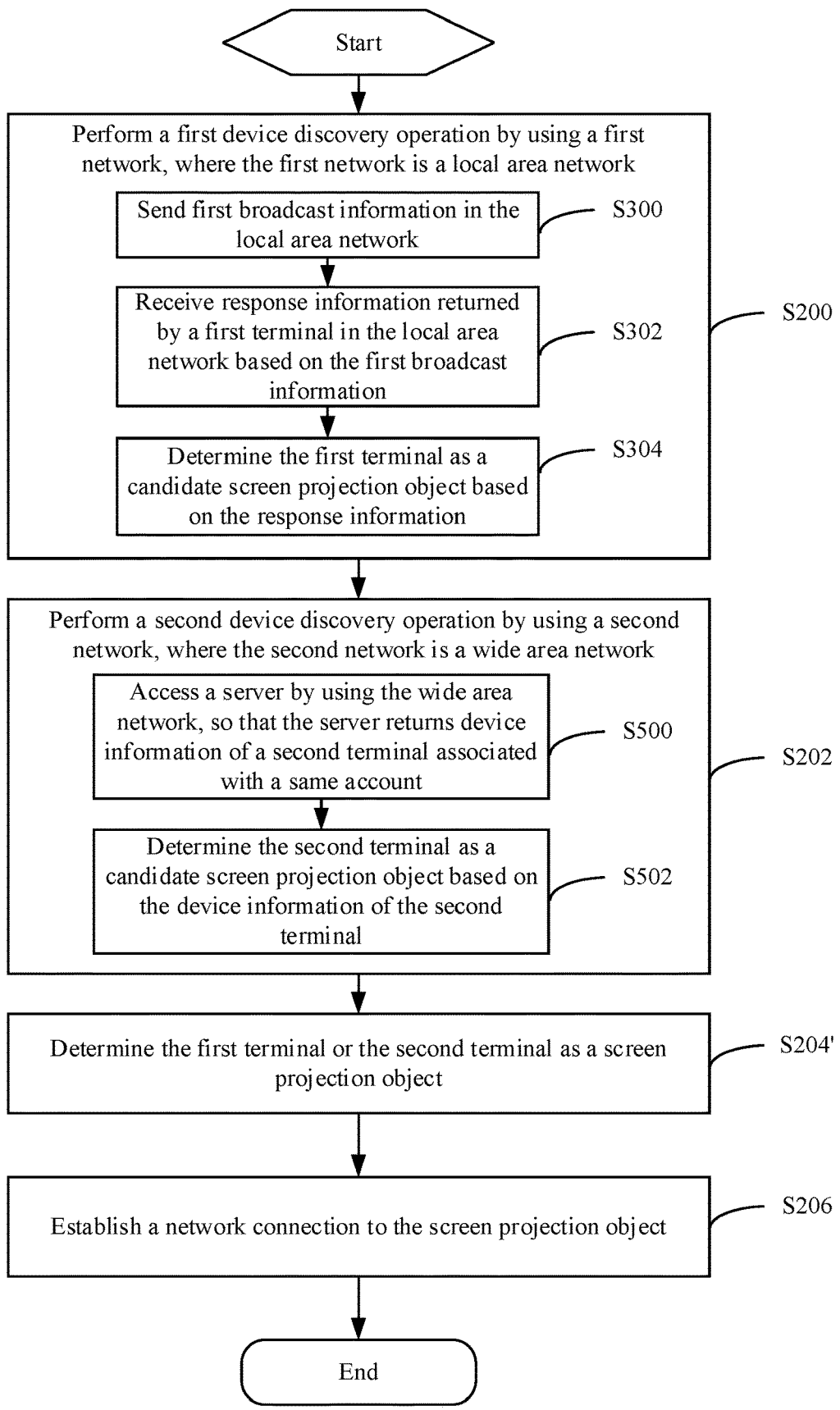
FIG. 6 is another schematic flowchart of a screen projection method according to Embodiment 1 of this application.

In an example embodiment, as shown in FIG. 6, when the computer device 2 discovers the first terminal device 4 by using the first device discovery operation and discovers the second terminal device 6 by using the second device discovery operation, step S204 may include step S204' of determining the first terminal device 4 or the second terminal device 6 as the screen projection object. Specifically, the computer device 2 may generate a selection list, so that a user selects the first terminal device 4 as the screen projection object of the computer device 2 based on the selection list, or selects the second terminal device 6 as the screen projection object of the computer device 2 based on the selection list.

Step S206. Establish a network connection to the screen projection object.

The computer device 2 may select different network connection policies based on different screen projection objects.

In an example embodiment, if the first terminal device 4 is determined as the screen projection object, the computer device 2 may perform the following step: establishing a first network connection to the first terminal device 4 based on the local area network.

Figure 7:
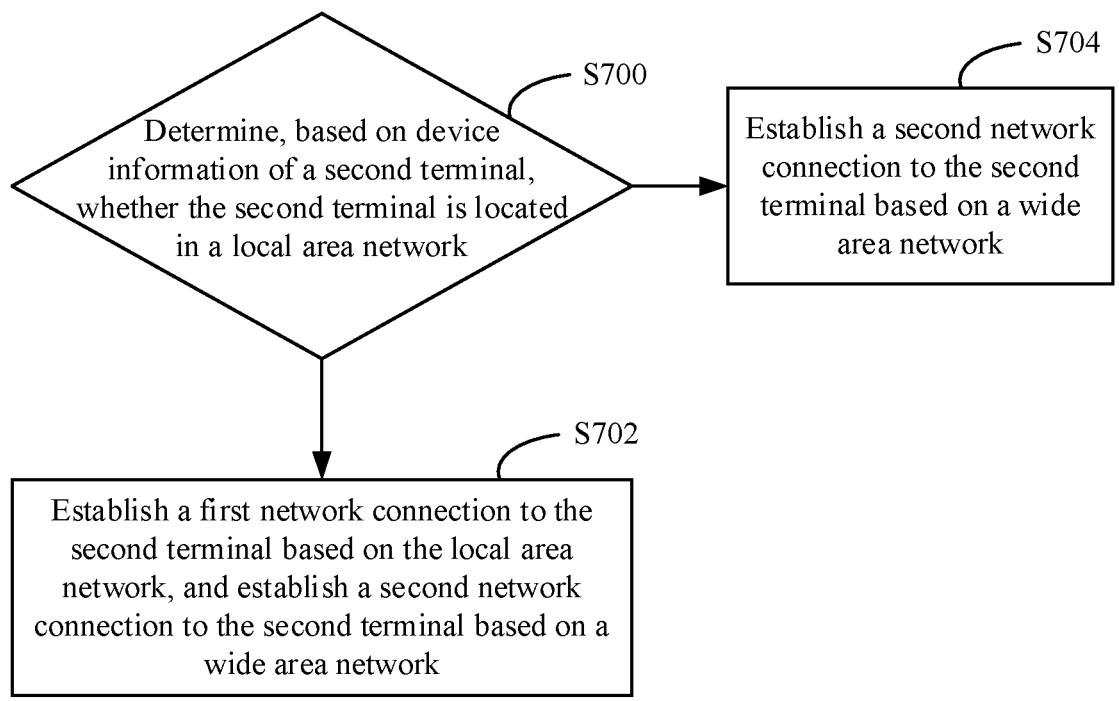
FIG. 7 schematically shows a sub-step of step S206 in FIG. 6.

In an example embodiment, if the second terminal device 6 is determined as the screen projection object, as shown in FIG. 7, the computer device 2 may perform the following steps: Step S700. Determine, based on the device information of the second terminal device 6, whether the second terminal device 6 is located in the local area network. Step S702. If the second terminal device is located in the local area network, establish a first network connection to the second terminal device 6 based on the local area network, and establish a second network connection to the second terminal device based on the wide area network. Step S704. If the second terminal device is not located in the local area network, establish the second network connection to the second terminal device based on the wide area network. For example, as shown in FIG. 1, although both the computer device 2 and the second terminal device 6 are located in the local area network established by the router 8, when the computer device 2 performs both the first device discovery operation and the second device discovery operation, the computer device 2 discovers the second terminal device 6 by using the second device discovery operation earlier than by using the first device discovery operation. In this case, it indicates that a transmission rate based on the local area network is not necessarily higher than a transmission rate based on the wide area network. Therefore, the computer device 2 may establish two network connections, namely, the first network connection based on the local area network and the second network connection based on the wide area network, to ensure that the screen projection operation and instruction exchange are performed in real time.

Figure 8:
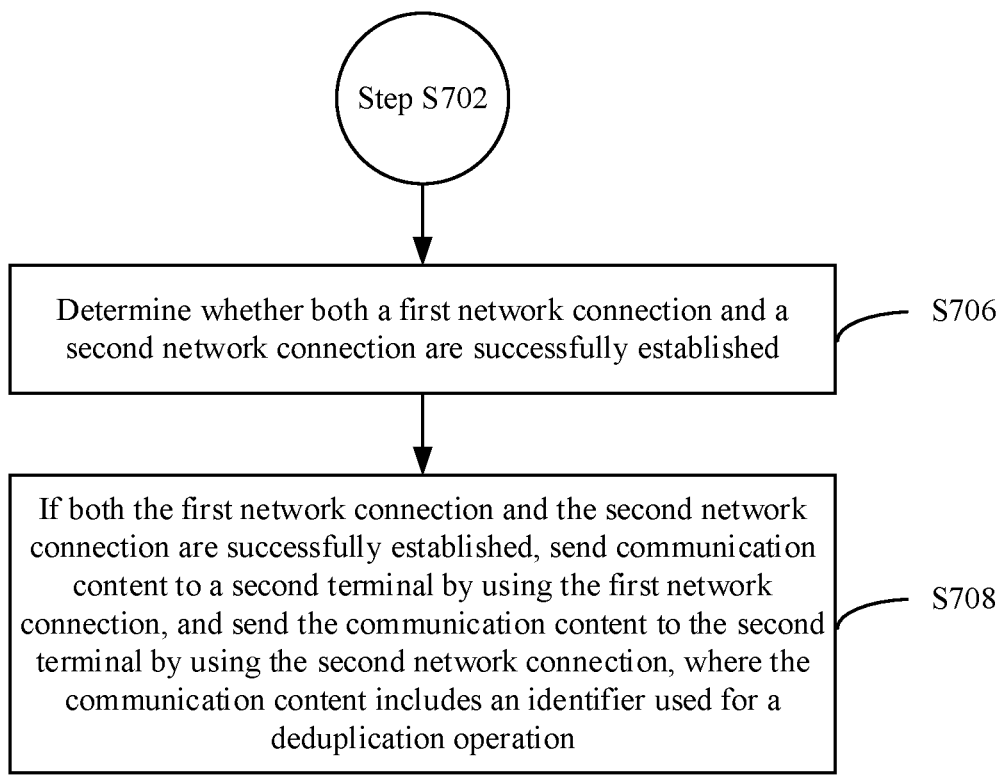
FIG. 8 is a newly-added schematic flowchart of a screen projection method according to Embodiment 1 of this application.

In an example embodiment, as shown in FIG. 8, the screen projection method further includes steps S706 and S708. Step S706. Determine whether both the first network connection and the second network connection are successfully established. Step S708. If both the first network connection and the second network connection are successfully established, send communication content to the second terminal device by using the first network connection, and send the communication content to the second terminal device by using the second network connection, where the communication content includes an identifier used for a deduplication operation. In other words, the computer device 2 may send same communication content by using both the first network connection and the second network connection. The second terminal device 6 receives the communication content delivered by using the first network connection and the communication content delivered by using the second network connection. If the communication content delivered by using the first network connection is earlier than the communication content delivered by using the second network connection, the second terminal device 6 responds to the communication content delivered by using the first network connection, and performs a deduplication operation such as a deletion operation on the communication content delivered by using the second network connection. The identifier (such as a number) in the communication content is a basis for the deduplication operation. For example, if communication content whose number is "007" is first received by using the first network connection, and then the communication content whose number is "007" is received by using the second network connection, the second terminal device 6 may perform, based on the number "007", a deduplication operation on the communication content received by using the second network connection, to avoid a repeated response. In this embodiment, the computer device 2 uses a delivery priority-based principle, to improve real-time performance of the screen projection operation and instruction exchange.

In a conventional screen projection operation, a candidate screen projection object is discovered only by using the local area network and a related device discovery protocol. Consequently, a discovery success rate and accuracy of device discovery are low, and screen projection experience is affected. Compared with the conventional screen projection operation, in the screen projection method in this embodiment, a plurality of corresponding device discovery operations are performed by using a plurality of networks, so that a candidate screen projection object can be discovered in a plurality of manners, to effectively increase a discovery success rate and accuracy of device discovery.

In addition, different networks may present different network quality of service in different time periods. In the screen projection method in this embodiment, a plurality of corresponding device discovery operations are performed by using a plurality of networks, to avoid the following problem: A device discovery operation performed by using a single network causes a low device discovery speed and a discovery failure due to poor network quality of service. In other words, the screen projection method in this embodiment further increases a device discovery speed while increasing a discovery success rate and accuracy.

Embodiment 2

Figure 9:
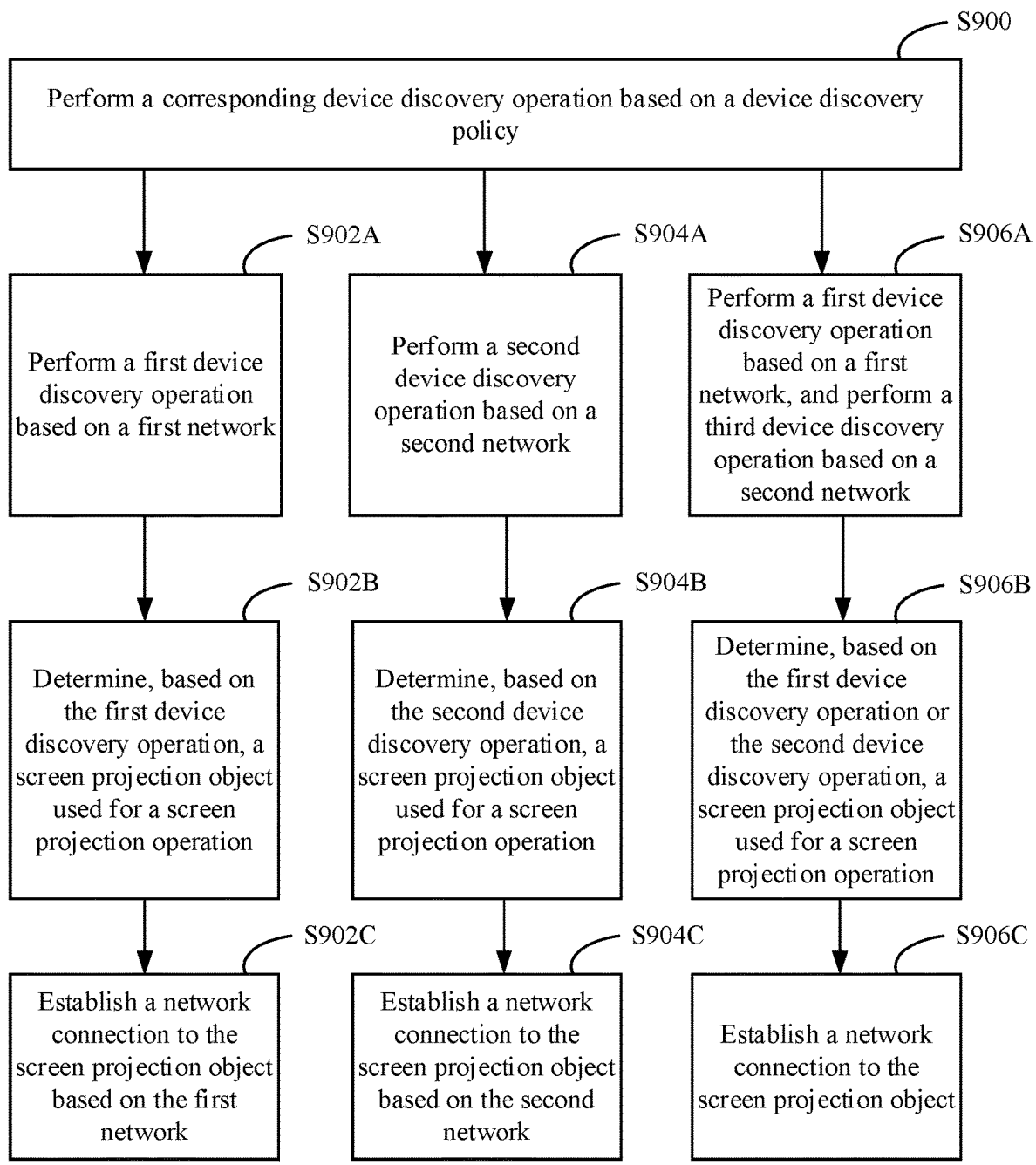
FIG. 9 is a schematic flowchart of a screen projection method according to Embodiment 2 of this application.

To enable the computer device 2 to perform different device discovery operations based on different requirements, Embodiment 2 is provided below. FIG. 9 is a schematic flowchart of a screen projection method according to Embodiment 2 of this application. The following is described by using an example in which a computer device 2 is an execution body. As shown in FIG. 9, the screen projection method includes steps S900 to S906.

Step S900. Perform a corresponding device discovery operation based on a device discovery policy.

The device discovery policy includes a first device discovery policy, a second device discovery policy, and a third device discovery policy.

The first device discovery policy is correspondingly used to perform a first device discovery operation.

The second device discovery policy is correspondingly used to perform a second device discovery operation.

The third device discovery policy is correspondingly used to perform both the first device discovery operation and the second device discovery operation.

Figure 10:
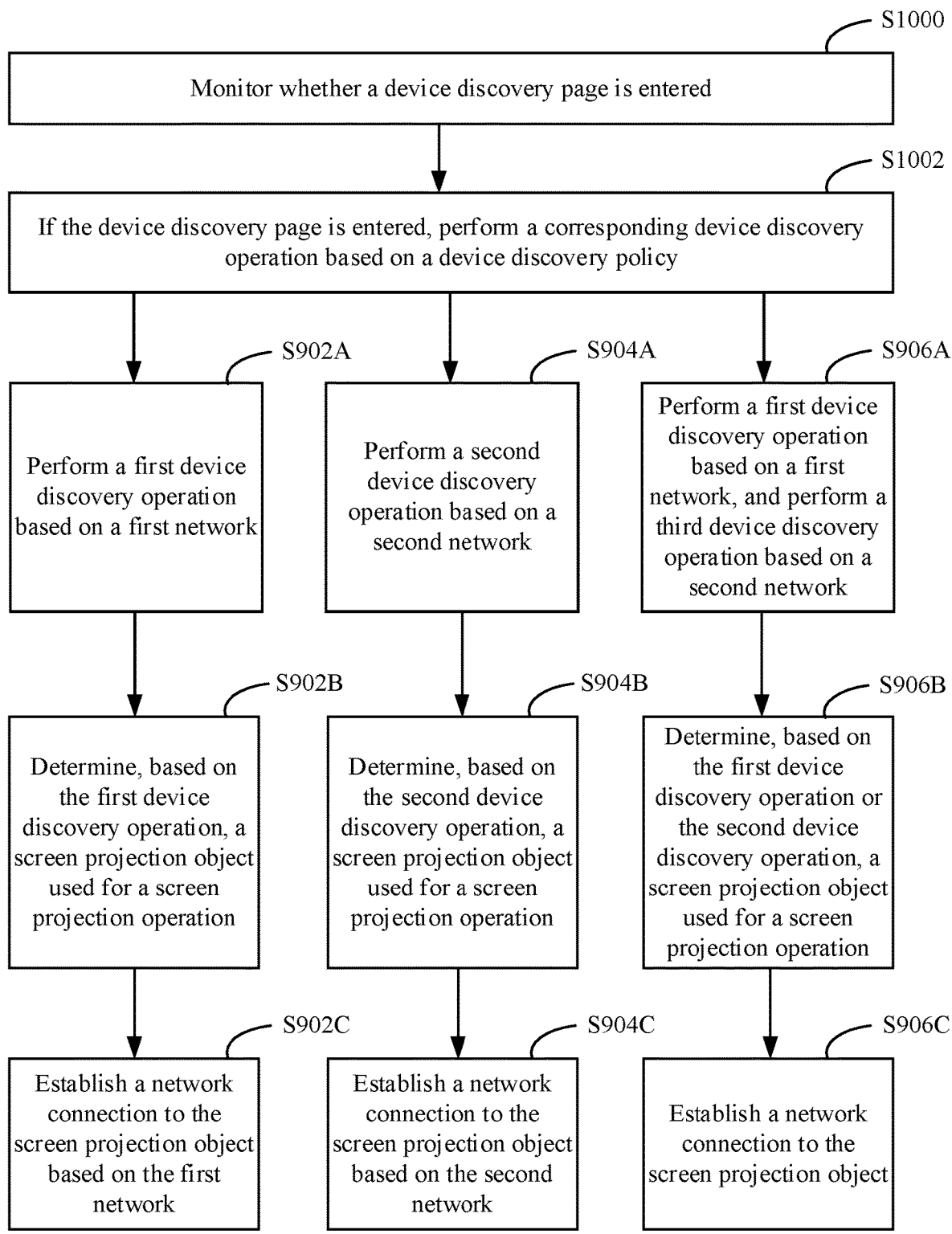
FIG. 10 is another schematic flowchart of a screen projection method according to Embodiment 2 of this application.

In an example embodiment, to further simplify a screen projection operation process to improve screen projection efficiency, as shown in FIG. 10, step S900 may include steps S1000 and S1002. Step S1000. Monitor whether a device discovery page is entered. Step S1002. If the device discovery page is entered, perform the corresponding device discovery operation based on the device discovery policy. Correspondingly, if the device discovery page is not entered, no device discovery operation is performed.

Step S902A. Perform the first device discovery operation based on a first network.

In an example embodiment, the first network includes a local area network.

In an example embodiment, the performing the first device discovery operation based on a first network may include the following steps: sending first broadcast information in the local area network; receiving response information returned by a first terminal device in the local area network based on the first broadcast information; and determining the first terminal device as a candidate screen projection object based on the response information.

In an example embodiment, the performing the first device discovery operation based on a first network may include the following steps: receiving second broadcast information in the local area network, where the second broadcast information includes broadcast information from a first terminal device; and determining the first terminal device as a candidate screen projection object based on the second broadcast information.

Step S902B. Determine, based on the first device discovery operation, a screen projection object used for a screen projection operation.

Step S902C. Establish a network connection to the screen projection object based on the first network.

Step S904A. Perform the second device discovery operation based on a second network.

In an example embodiment, the second network may be a wide area network.

In an example embodiment, the performing the second device discovery operation based on a second network may include the following steps: accessing a server by using the wide area network, so that the server returns device information of a second terminal device associated with a same account; and determining the second terminal device as a candidate screen projection object based on the device information of the second terminal device.

Step S904B. Determine, based on the second device discovery operation, a screen projection object used for a screen projection operation.

Step S904C. Establish a network connection to the screen projection object based on the second network.

Step S906A. Perform the first device discovery operation based on a first network, and perform the second device discovery operation based on a second network.

Step S906B. Determine, based on the first device discovery operation and the second device discovery operation, a screen projection object used for a screen projection operation.

Step S906C. Establish a network connection to the screen projection object.

Compared with a conventional screen projection operation, in the screen projection method in this embodiment, a corresponding device discovery operation may be performed based on different device discovery policies, so that the computer device 2 can perform different device discovery operations based on different requirements. When performing both the first device discovery operation and the second device discovery operation based on the device discovery policy, the computer device 2 may discover a candidate screen projection object by using both the first device discovery operation and the second device discovery operation, to effectively increase a discovery success rate and accuracy of the device discovery operation, and avoid the following problem: A device discovery operation performed by using a single network causes a low device discovery speed and a discovery failure due to poor network quality of service.

Embodiment 3

Figure 11:
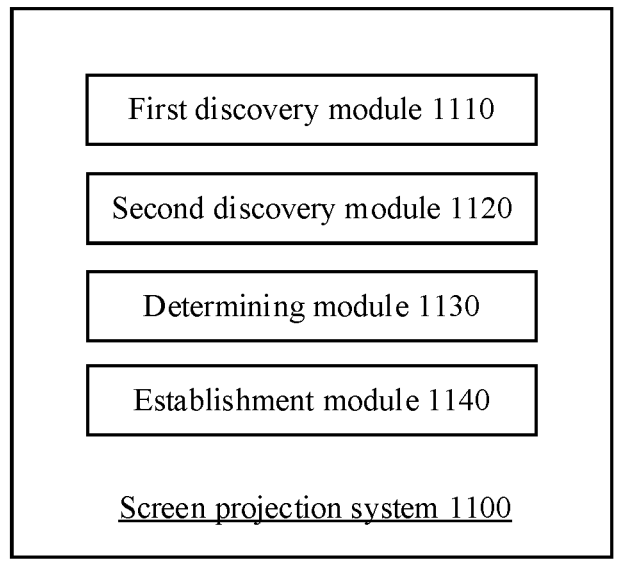
FIG. 11 is a schematic block diagram of a screen projection system according to Embodiment 3 of this application.

FIG. 11 is a schematic block diagram of a screen projection system according to Embodiment 3 of this application. The screen projection system may be divided into one or more program modules. The one or more program modules are stored in a storage medium, and are executed by one or more processors, to complete this embodiment of this application. The program module in this embodiment of this application is a series of computer readable instruction segments that can be used to complete a specified function. The following specifically describes a function of each program module in this embodiment.

As shown in FIG. 11, the screen projection system 1100 may include a first discovery module 1110, a second discovery module 1120, a determining module 1130, and an establishment module 1140.

The first discovery module 1110 is configured to perform a first device discovery operation by using a first network.

The second discovery module 1120 is configured to perform a second device discovery operation by using a second network.

The determining module 1130 is configured to determine, based on the first device discovery operation and the second device discovery operation, a screen projection object used for a screen projection operation.

The establishment module 1140 is configured to establish a network connection to the screen projection object.

In an example embodiment, the screen projection system 1100 further includes a policy execution module (not shown), and the policy execution module is configured to: perform a corresponding device discovery operation based on a device discovery policy, where the device discovery policy includes a first device discovery policy, a second device discovery policy, and a third device discovery policy; the first device discovery policy is correspondingly used to perform the first device discovery operation; the second device discovery policy is correspondingly used to perform the second device discovery operation; and the third device discovery policy is correspondingly used to perform both the first device discovery operation and the second device discovery operation.

In an example embodiment, the policy execution module is further configured to: monitor whether a device discovery page is entered; and if the device discovery page is entered, perform the corresponding device discovery operation based on the device discovery policy.

In an example embodiment, the first network includes a local area network, and the first discovery module 1110 is further configured to: send first broadcast information in the local area network; receive response information returned by a first terminal device in the local area network based on the first broadcast information; and determine the first terminal device as a candidate screen projection object based on the response information.

In an example embodiment, the first network includes a local area network, and the first discovery module 1110 is further configured to: receive second broadcast information in the local area network, where the second broadcast information includes broadcast information from a first terminal device; and determine the first terminal device as a candidate screen projection object based on the second broadcast information.

In an example embodiment, the second network includes a wide area network, and the second discovery module 1120 is further configured to: access a server by using the wide area network, so that the server returns device information of a second terminal device associated with a same account; and determine the second terminal device as a candidate screen projection object based on the device information of the second terminal device.

In an example embodiment, the determining module 1130 is further configured to: determine the first terminal device or the second terminal device as the screen projection object.

In an example embodiment, the establishment module 1140 is further configured to: if the second terminal device is determined as the screen projection object, determine, based on the device information of the second terminal device, whether the second terminal device is located in the local area network; and if the second terminal device is located in the local area network, establish a first network connection to the second terminal device based on the local area network, and establish a second network connection to the second terminal device based on the wide area network; or if the second terminal device is not located in the local area network, establish the second network connection to the second terminal device based on the wide area network.

In an example embodiment, the screen projection system 1100 further includes a content sending module (not shown), and the content sending module is configured to: determine whether both the first network connection and the second network connection are successfully established; and if both the first network connection and the second network connection are successfully established, send communication content to the second terminal device by using the first network connection, and send the communication content to the second terminal device by using the second network connection, where the communication content includes an identifier used for a deduplication operation.

Embodiment 4

Figure 12:
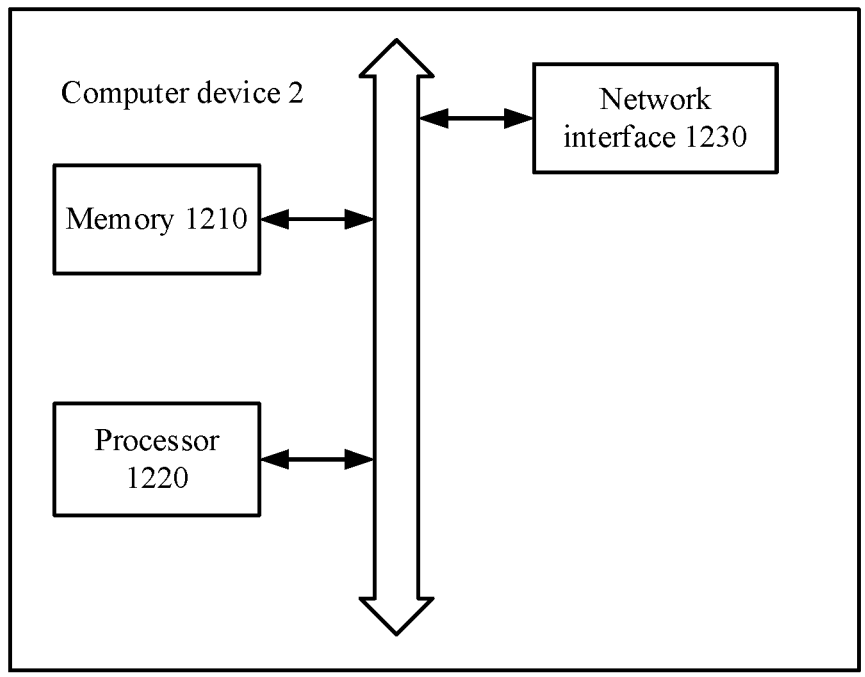
FIG. 12 is a schematic diagram of a hardware architecture of a computer device suitable for implementing a screen projection method according to Embodiment 4 of this application.

FIG. 12 is a schematic diagram of a hardware architecture of a computer device 2 suitable for implementing a screen projection method according to Embodiment 4 of this application. In this embodiment, the computer device 2 is a device that can automatically calculate a value and/or process information based on an instruction that is set or stored in advance. For example, the computer device 2 may be a smartphone, a tablet computer, a notebook computer, a desktop computer, a rack server, a blade server, a tower server, or a cabinet server (including an independent server, or a server cluster including a plurality of servers). As shown in FIG. 12, the computer device 2 at least includes but is not limited to a memory 1210, a processor 1220, and a network interface 1230 that can be communicatively connected to each other by using a system bus.

The memory 1210 includes at least one type of computer-readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 1210 may be an internal storage module of the computer device 2, such as a hard disk or a memory of the computer device 2. In some other embodiments, the memory 1210 may be an external storage device of the computer device 2, for example, a removable hard disk, a smart media card (SMC), a secure digital (SD) card, or a flash card that is disposed on the computer device 2. Certainly, the memory 1210 may include both an internal storage module of the computer device 2 and an external storage device of the computer device 2. In this embodiment, the memory 1210 is generally configured to store an operating system and various application software that are installed on the computer device 2, for example, program code of the screen projection method. In addition, the memory 1210 may be further configured to temporarily store various types of data that has been output or is to be output.

The processor 1220 may be a central processing unit (CPU), a controller, a microcontroller, a microprocessor, or another data processing chip in some embodiments. The processor 1220 is generally configured to control an overall operation of the computer device 2, for example, perform control and processing related to data exchange or communication performed by the computer device 2. In this embodiment, the processor 1220 is configured to run program code stored in the memory 1210 or process data.

The network interface 1230 may include a wireless network interface or a wired network interface, and the network interface 1230 is generally configured to establish a communication link between the computer device 2 and another computer device. For example, the network interface 1230 is configured to: connect the computer device 2 to an external terminal device by using a network, and establish a data transmission channel, a communication link, and the like between the computer device 2 and the external terminal device. The network may be a wireless or wired network such as an Intranet, the Internet, a global system for mobile communications (GSM), a wideband code division multiple access (WCDMA), a 4G network, a 5G network, Bluetooth, or Wi-Fi.

It should be noted that FIG. 12 shows only a computer device with the components 1210 to 1230. However, it should be understood that implementation of all the shown components is not required, and more or fewer components may be alternatively implemented.

In this embodiment, the screen projection method stored in the memory 1210 may be further divided into one or more program modules to be executed by one or more processors (the processor 1220 in this embodiment), so as to complete this embodiment of this application.

Embodiment 5

This application further provides a computer-readable storage medium. The computer-readable storage medium stores computer readable instructions. When the computer readable instructions are executed by a processor, the following steps are implemented:

performing a first device discovery operation by using a first network;

performing a second device discovery operation by using a second network;

determining, based on the first device discovery operation and the second device discovery operation, a screen projection object used for a screen projection operation; and establishing a network connection to the screen projection object.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is generally configured to store an operating system and various application software that are installed on the computer device, for example, program code of the screen projection method in the embodiments. In addition, the computer-readable storage medium may be further configured to temporarily store various types of data that has been output or is to be output.

Clearly, a person skilled in the art should understand that the modules or steps in the embodiments of this application may be implemented by using a general computing apparatus. The modules or steps may be integrated into a single computing apparatus or distributed in a network including a plurality of computing apparatuses. Optionally, the modules or steps may be implemented by using program code that can be executed by the computing apparatus. Therefore, the modules or steps may be stored in a storage apparatus for execution by the computing apparatus. In addition, in some cases, the shown or described steps may be performed in a sequence different from the sequence herein. Alternatively, the modules or steps may be separately made into integrated circuit modules. Alternatively, a plurality of modules or steps in the modules or steps are made into a single integrated circuit module for implementation. In this way, a combination of any specific hardware and software is not limited in the embodiments of this application.

The foregoing descriptions are merely preferred embodiments of this application, and are not intended to limit the scope of this application. Any equivalent structure or equivalent process change made by using the content of the specification and the accompanying drawings of this application, or when directly or indirectly applied to other related technical fields, shall fall within the protection scope of this application.

What is claimed is:

1. A method for projecting content to a device, comprising:

performing a first device discovery operation by using a first network, wherein the first network comprises a local area network, and wherein the performing a first device discovery operation by using a first network further comprises sending broadcast information in the local area network;

performing a second device discovery operation by using a second network, wherein the second network comprises a wide area network, and wherein the performing a second device discovery operation by using a second network further comprises communicating with a server via the wide area network and receiving, from the server, device information of a second terminal device associated with a same account;

determining the device to which the content is to be projected based on the first device discovery operation and the second device discovery operation; and establishing a network connection with the device, wherein the establishing a network connection with the device further comprises:

in response to determining the second terminal device as the device to which the content is to be projected, determining whether the second terminal device is located in the local area network based on the device information of the second terminal device, in response to determining that the second terminal device is located in the local area network, establishing a first network connection with the second terminal device based on the local area network, and establishing a second network connection with the second terminal device based on the wide area network, and in response to determining that the second terminal is not located in the local area network, establishing the second network connection with the second terminal based on the wide area network.

2. The method according to claim 1, further comprising:
performing a corresponding device discovery operation based on a device discovery policy;
wherein the device discovery policy comprises a first device discovery policy, a second device discovery policy, and a third device discovery policy;
wherein the first device discovery policy corresponds to performing the first device discovery operation;
wherein the second device discovery policy corresponds to performing the second device discovery operation; and
wherein the third device discovery policy corresponds to performing both the first device discovery operation and the second device discovery operation.

3. The method according to claim 1, wherein the performing a first device discovery operation by using a first network further comprises:
receiving response information returned by a first terminal device in the local area network, the response information responding to the first broadcast information; and
determining the first terminal device as a candidate device based on the response information.

4. The method according to claim 1, wherein the performing a first device discovery operation by using a first network comprises:
receiving second broadcast information in the local area network, wherein the second broadcast information comprises broadcast information from a first terminal device; and
determining the first terminal device as a candidate device based on the second broadcast information.

5. The method according to claim 1, wherein the performing a second device discovery operation by using a second network further comprises:
accessing the server by using the wide area network; and
determining the second terminal device as a candidate device based on the device information of the second terminal device.

6. The method according to claim 1, further comprising:
determining whether both the first network connection and the second network connection are successfully established; and
in response to determining that both the first network connection and the second network connection are successfully established, sending communication content to the second terminal device by using the first network connection, and sending the communication content to the second terminal device by using the second network connection, wherein the communication content comprises an identifier configured for a deduplication operation.

7. A computer device for projecting content to other device, wherein the computer device comprises a memory, a processor, and computer readable instructions that are stored in the memory, and when executing the computer readable instructions, the processor is configured to implement operations comprising:
performing a first device discovery operation by using a first network, wherein the first network comprises a local area network, and wherein the performing a first device discovery operation by using a first network further comprises sending broadcast information in the local area network;
performing a second device discovery operation by using a second network, wherein the second network comprises a wide area network, and wherein the performing a second device discovery operation by using a second network further comprises communicating with a server via the wide area network and receiving, from the server, device information of a second terminal device associated with a same account;
determining the other device to which the content is to be projected based on the first device discovery operation and the second device discovery operation; and
establishing a network connection with the other device, wherein the establishing a network connection with the other device further comprises:
in response to determining the second terminal device as the other device to which the content is to be projected, determining whether the second terminal device is located in the local area network based on the device information of the second terminal device,
in response to determining that the second terminal device is located in the local area network, establishing a first network connection with the second terminal device based on the local area network, and establishing a second network connection with the second terminal device based on the wide area network, and
in response to determining that the second terminal is not located in the local area network, establishing the second network connection with the second terminal based on the wide area network.

8. The computer device according to claim 7, the operations further comprising:
performing a corresponding device discovery operation based on a device discovery policy;
wherein the device discovery policy comprises a first device discovery policy, a second device discovery policy, and a third device discovery policy;
wherein the first device discovery policy corresponds to performing the first device discovery operation;
wherein the second device discovery policy corresponds to performing the second device discovery operation; and
wherein the third device discovery policy corresponds to performing both the first device discovery operation and the second device discovery operation.

9. The computer device according to claim 8, wherein the performing a corresponding device discovery operation based on a device discovery policy comprises:
monitoring whether a device discovery page is entered; and
performing the corresponding device discovery operation based on the device discovery policy in response to determining that the device discovery page is entered.

10. The computer device according to claim 7, wherein the performing a first device discovery operation by using a first network further comprises:
receiving response information returned by a first terminal device in the local area network, the response information responding to the first broadcast information; and
determining the first terminal device as a candidate device based on the response information.

11. The computer device according to claim 7, wherein the performing a first device discovery operation by using a first network comprises:

receiving second broadcast information in the local area network, wherein the second broadcast information comprises broadcast information from a first terminal device; and determining the first terminal device as a candidate device based on the second broadcast information.

12. The computer device according to claim 7, wherein the performing a second device discovery operation by using a second network further comprises:

accessing the server by using the wide area network; and determining the second terminal as a candidate device based on the device information of the second terminal device.

13. The computer device according to claim 7, the operations further comprising:

determining whether both the first network connection and the second network connection are successfully established; and in response to determining that both the first network connection and the second network connection are successfully established, sending communication content to the second terminal device by using the first network connection, and sending the communication content to the second terminal device by using the second network connection, wherein the communication content comprises an identifier configured for a deduplication operation.

14. A non-transitory computer-readable storage medium, wherein the computer-readable storage medium stores computer readable instructions, and wherein the computer readable instructions upon execution by at least one processor cause the at least one processor to perform operations comprising:

performing a first device discovery operation by using a first network, wherein the first network comprises a local area network, and wherein the performing a first device discovery operation by using a first network further comprises sending broadcast information in the local area network;

performing a second device discovery operation by using a second network, wherein the second network comprises a wide area network, and wherein the performing a second device discovery operation by using a second network further comprises communicating with a server via the wide area network and receiving, from the server, device information of a second terminal device associated with a same account;

determining a device to which content is to be projected based on the first device discovery operation and the second device discovery operation; and establishing a network connection with the device, wherein the operations further comprise:

determining whether the second terminal device is located in the local area network based on the device information of the second terminal device in response to determining the second terminal device as the device to which the content is to be projected, in response to determining that the second terminal device is located in the local area network, establishing a first network connection with the second terminal device based on the local area network, and establishing a second network connection with the second terminal device based on the wide area network, and in response to determining that the second terminal is not located in the local area network, establishing the second network connection with the second terminal based on the wide area network.

15. The non-transitory computer-readable storage medium of claim 14, wherein the performing a first device discovery operation by using a first network further comprises:

receiving response information returned by a first terminal device in the local area network, the response information responding to the first broadcast information; and determining the first terminal device as a candidate device based on the response information.

16. The non-transitory computer-readable storage medium of claim 14, wherein the performing a first device discovery operation by using a first network comprises:

receiving second broadcast information in the local area network, wherein the second broadcast information comprises broadcast information from a first terminal device; and determining the first terminal device as a candidate device screen projection object based on the second broadcast information.

17. The non-transitory computer-readable storage medium of claim 14, wherein the performing a second device discovery operation by using a second network further comprises:

accessing the server by using the wide area network; and determining the second terminal as a candidate device based on the device information of the second terminal device.

* * * * *